A. A. PREVOST.
ELECTRIC MOTOR.
APPLICATION FILED MAR. 13, 1909.
934,462.
Patented Sept. 21, 1909.
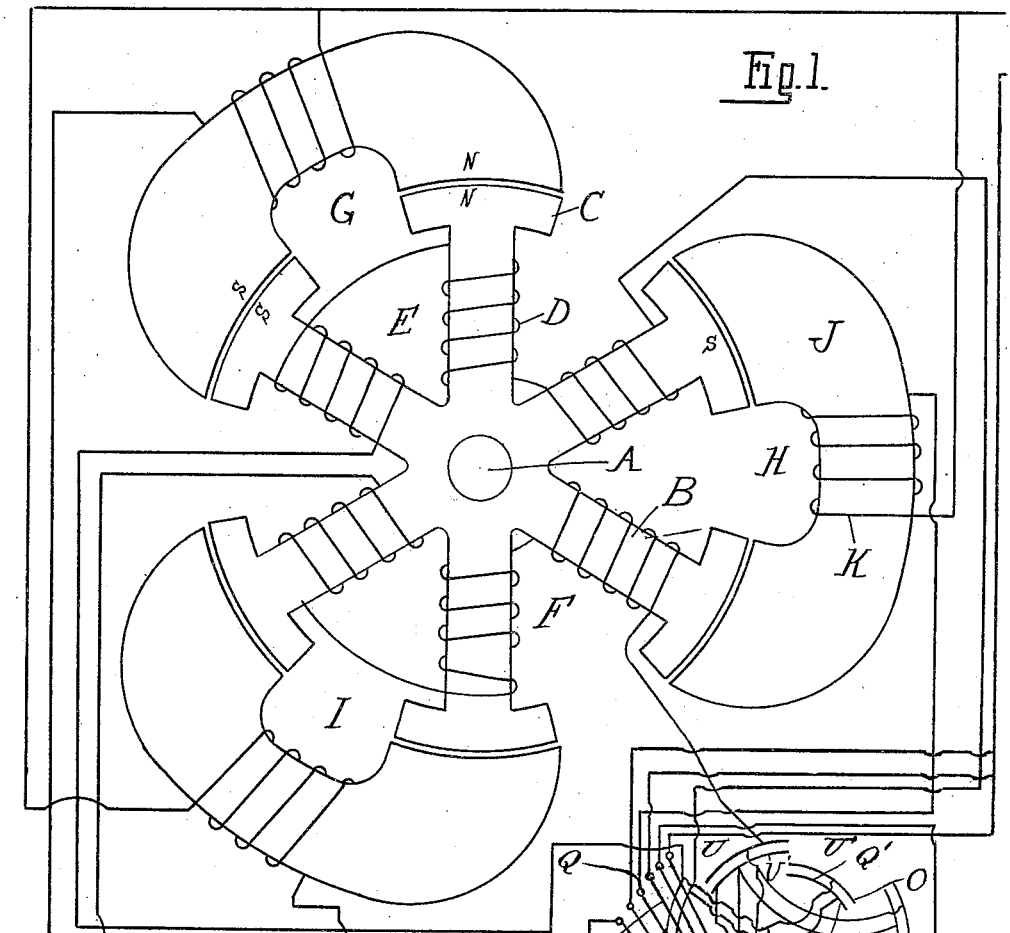
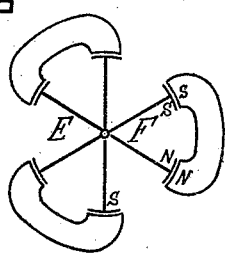
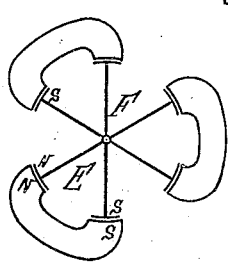
Witnesses
Inventor
Arthur A. Prevost

UNITED STATES PATENT OFFICE.

ARTHUR A. PREVOST, OF MOUNT CLEMENS, MICHIGAN.

ELECTRIC MOTOR.

934,462.

Specification of Letters Patent. Patented Sept. 21, 1909.

Application filed March 13, 1909. Serial No. 483,190.

*To all whom it may concern:*

Be it known that I, ARTHUR A. PREVOST, a citizen of the United States of America, residing at Mount Clemens, in the county of Macomb and State of Michigan, have invented certain new and useful Improvements in Electric Motors, of which the following is a specification, reference being had therein to the accompanying drawings.

The invention relates to electric motors of the direct current type, and consists in the novel construction as hereinafter set forth.

In the drawings—Figure 1 illustrates the motor diagrammatically in section in the plane of rotation; Figs. 2 and 3 are diagrams illustrating the operation.

A is the armature shaft upon which is mounted a plurality of radially-extending magnetic cores B preferably formed integral or by laminæ common to the several cores.

C are segmental pole pieces at the outer end of each core B, and D are windings upon each core. The windings D upon adjacent cores are arranged and connected to simultaneously energize an uneven number of cores so as to produce like poles at opposite ends of the group, and an intermediate unlike pole. As shown, there are six pole pieces, which are divided into two groups, E and F, of three pole pieces each, and these groups are also controlled by the commutator so as to be alternatively energized.

The field magnets are provided with the same total number of poles as the poles of the armature, but are divided into a different number of groups. Thus, as shown, there are three groups, G, H, and I, each comprising two poles of opposite polarity, and connected by a horse-shoe core J surrounded by windings K. The commutator L is provided with six pairs of contacts M M', N N' and O O', U U', V V' and W W' being arranged to be successively brought into operation in coöperation with the brushes P P', Q Q' and R R'. The contacts M M' are connected to the terminals of the windings of the armature group E. The contacts N N' are similarly connected to the terminals of the armature group F, while the contacts O O' V V' are coupled to the contacts M M' and the contacts U U' and W W' are connected to the contacts N N'.

The field magnets are successively energized in series circuit with the armature groups, the windings of the field group G being connected to the brushes P P', the group H to the brushes Q Q', and the group I to the brushes R R'. Thus the field groups will be energized in rotation, while the armature groups will be alternately energized with two of its poles initially in registration with like poles in the energized field magnet, and a third pole approaching an energized unlike pole in the field.

What I claim as my invention is:

1. An electric motor comprising armature and field magnets having a like number of poles divided into an unlike number of different groups, and means whereby the groups of the one are successively energized alternately in series with the group of the other.

2. An electric motor comprising armature and field magnets having a like number of correspondingly spaced poles divided into an unlike number of groups, each group of the one comprising two poles of like polarity, and an intermediate unlike pole, and each group of the other comprising a pair of unlike poles, and means for successively energizing the groups of the one alternately in series with the group of the others.

3. An electric motor comprising an armature having a series of radial magnetic cores connected at their inner ends, windings on said cores and connections whereby said magnets are divided into groups, each group comprising two like poles and an intermediate unlike pole.

4. An electric motor comprising an armature having a series of radially-extending magnetic cores connected at their inner ends, windings on said cores connected to form a plurality of groups, each group having two like poles, and an intermediate unlike pole, field magnets having a like number of poles divided into an unlike number of groups, each group comprising two unlike poles, and means for successively energizing the magnetic groups of the field alternately in series with the groups of the armature.

5. An electric motor comprising a series of radial magnetic cores integral with each other, and terminating in integral segmental pole pieces at their outer ends, windings about said radial cores connected into a plurality of groups arranged to produce like poles, and an intermediate like pole in each group, a series of field magnets having a total number of poles corresponding to the number of poles of the armature, but divided into an unlike number of groups, and windings for said field magnets successively energized and alternately in series with the groups of the armature.

In testimony whereof I affix my signature in presence of two witnesses.

ARTHUR A. PREVOST.

Witnesses:
   CHARLES H. HUMMRICH,
   A. E. VAN EPS.